(12) United States Patent
Ji et al.

(10) Patent No.: US 6,636,681 B2
(45) Date of Patent: Oct. 21, 2003

(54) OPTICAL ATTENUATOR

(75) Inventors: Lianhua Ji, Boulder, CO (US); Jiuzhi Xue, Broomfield, CO (US)

(73) Assignee: Photonport Technologies, Inc., Boulder, CO (US)

( * ) Notice: Subject to any disclaimer, the term of this patent is extended or adjusted under 35 U.S.C. 154(b) by 141 days.

(21) Appl. No.: 09/851,193

(22) Filed: May 7, 2001

(65) Prior Publication Data

US 2002/0164146 A1 Nov. 7, 2002

(51) Int. Cl.$^7$ ................................................. G02B 6/00
(52) U.S. Cl. ....................................... 385/140; 385/122
(58) Field of Search ............................... 385/140, 122, 385/14, 15, 16, 17; 359/341.4, 341.41, 341.42

(56) References Cited

U.S. PATENT DOCUMENTS

| | | | | |
|---|---|---|---|---|
| 4,716,449 A | * | 12/1987 | Miller | 257/21 |
| 4,751,378 A | | 6/1988 | Hinton et al. | 250/211 |
| 4,754,132 A | * | 6/1988 | Hinton et al. | 250/214 LS |
| 4,851,840 A | | 7/1989 | McAulay | 341/137 |
| 5,323,019 A | | 6/1994 | Dutta et al. | 257/17 |
| 5,325,459 A | * | 6/1994 | Schmidt | 385/140 |
| 5,747,791 A | * | 5/1998 | Coroy | 250/214 R |
| 5,963,291 A | * | 10/1999 | Wu et al. | 349/196 |
| 6,115,375 A | | 9/2000 | Kim et al. | 370/388 |

OTHER PUBLICATIONS

Miller et al., "The Quantum Well Self–Electrooptic Effect Device: Optoelecronic Bistability and Oscillation, and Self–Linearized Modulation," IEEE Journal Of Quantum Electronics, IEEE, vol. QE–21 (No. 9), p. 1462–1476 (Sep., 1985).
Miller et al., "Novel hybrid optically bistable switch: The quantum well self–electro–optic effect device," Appl. Phys. Lett., American Institute of Physics, vol. 45 (No. 1), p. 13–15 (Jul. 1, 1984).
Wood et al., "High–speed Optical modulation with GaAs/GaA1As quantum wells in a p–i–n diode structure," Appl. Phys. Lett., American Institute of Physics, vol. 44 (No. 1), p. 16–18 (Jan. 1, 1984).

David A.B. Miller, "Refractive Fabry–Perot Bistability with Linear Absorption: Theory of Operation and Cavity Optimization," IEEE Journal Of Quantum Electronics, IEEE, vol. QE–17 (No. 3), p. 306–311 (Mar., 1981).

Miller et al., "Optical bistability and signal amplification in a semiconductor crystal: applications of new low–power nonlinear effects in InSb," Appl. Phys. Lett., American Institute of Physics, vol. 35 (No. 9), p. 658–660 (Nov. 1, 1979).

* cited by examiner

Primary Examiner—Robert H. Kim
Assistant Examiner—Therese Barber
(74) Attorney, Agent, or Firm—Patton Boggs LLP

(57) ABSTRACT

A variable optical attenuator having a multiple quantum well structure (MQWS), a feedback system that provides a feedback signal, and a current control that utilizes the feedback signal to regulate the attenuation of the MQWS. In one embodiment, the MQWS is part of a photo intrinsic diode, and in another embodiment it is part of a self-electro-optic effect device (SEED). Preferably, there are a plurality of MQWSs, which may be arranged in a serial stack or may be arranged in a plane parallel to the MQWS layers, with light passed from one MQWS to the next via prisms. Preferably, the beam is separated into component wavelengths by a demultiplexer, each wavelength is attenuated by one or more MQWSs designed to attenuate that wavelength, and the beam is then recombined with an optical multiplexer. In another embodiment, the attenuator is combined with an erbium-doped fiber amplifier (EDFA) to provide an amplifier having an essentially flat gain as a function of wavelength.

18 Claims, 7 Drawing Sheets

OPTICAL ATTENUATOR

BACKGROUND OF THE INVENTION

1. Field of the Invention

The invention relates to the field of optical communications, and more particularly to a variable optical attenuator for use in optical communication devices.

2. Description of the Prior Art

One of the key issues in optical communications is the regulation of optical signal power at both the input and output ports. At the input port, injection optical power has to be limited to a certain level to avoid unwanted nonlinear effects in optical fibers. At the output end, the optical power has to be controlled to within the limit of the dynamic range of the optical receiver. Further, the loss of optical energies during transmission in optical fibers and gains passing through fiber amplifiers, such as erbium-doped fiber amplifiers (EDFA), are generally wavelength dependent, and thus, if not modulated, the optical energies for different wavelengths would be different.

To achieve best performance for the optical network and, in the extreme case, to avoid damaging optical receivers, modulation of and sometimes flattening of optical power across spectral range is necessary. Modulators, particularly fixed optical modulators, such as fixed optical filters, are known in the art. However, such modulators, even if they are of the highest quality, generally are inadequate to address the problems of inappropriate power distribution across optical wavelengths. For example, in real-world optical networks, it is often necessary to quickly reconfigure a network, such as when it is necessary to recover from broken fibers or redirect network traffic to adjust for load. Fixed attenuators, or even manually adjustable attenuators, are not adequate for such quick network reconfiguration. Instead, variable optical attenuators must be used where the reduction of optical power for each wavelength can be dynamically adjusted as necessary, according to the detected power level at the wavelength, and sufficiently rapidly that users do not experience significant down time as networks are reconfigured.

In the prior art, modulation and flattening of optical powers has been performed by converting the optical signal to electrical signals, adjusting the electrical signals by mechanical or thermal mechanisms, and then regenerating the optical signals with suitable optical powers. This is recognized in the art as being a less than desirable solution, since it requires a more complex and more costly system than would be necessary if the modulation and flattening could be done optically. Thus, variable optical attenuators, such as liquid crystal and MEMs based optical attenuators that work in optical domains, is generally used in present-day fiber communication systems. However, while these attenuators are much faster than mechanically or thermally adjusted attenuators, they are not sufficient when dynamic network configuration must be performed faster than the millisecond range. In addition such attenuators are typically also bulky and polarization dependent.

Multiple quantum well structures (MQWS) and self-electrooptic effect devices (SEED) are known. See "The Quantum Well Self-Electrooptic Effect Device: Optoelectronic Bistability and Oscillation, and Self-Linearized Modulation", D. A. B. Miller et al., *IEEE, J. Quantum Electronics* QE21, 1462 (1985). MQW structures and SEED devices have been used in bistable logic devices, digital to analog converters, and modulators. See U.S. Pat. No. 4,751, 378, Optical Device With Quantum Well Absorption, issued to Harvard S. Hinton et al. on Jun. 14, 1988; U.S. Pat. No. 4,851,840, Optical Analog To Digital Converter, issued to Alstair D. McAulay on Jul. 25, 1989; U.S. Pat. No. 5,323, 019, All Optical Multiple Quantum Well Optical Modulator, issued to Mitra Dutla et al. on Jun. 21, 1994; and U.S. Pat. No. 6,115,375, Multistage Optical Packet Switching Apparatus Using Self Electro-Optic-Effect Devices, issued to Joon Kim Kwang et al. on Sep. 5, 2000.

SUMMARY OF THE INVENTION

The invention solves the above problems by providing a dynamically variable optical attenuator utilizing a multiple quantum well structure (MQWS), and a method of utilizing such an MQWS to attenuate light.

The optical attenuator according to the invention comprises an MQWS and a controller for controlling the attenuation in the MQWS. A light beam to be modulated is incident on the MQWS, is attenuated in the MQWS as determined by the controller, and then exits the MQWS. Preferably, the controller is a current controller. Preferably, the current controller comprises a current mirror. Preferably, the optical attenuator includes a photodetector, responsive to a portion of the exit optical beam, which photodetector provides a feedback signal to the controller. Preferably, the current controller includes a source of a reference signal and a comparator that compares the feedback signal from the photodetector to the reference signal to provide the output to the current mirror.

In the preferred embodiment, the MQWS is formed inside a photo intrinsic (PIN) diode to form a light modulator. The MQWS is preferably a stack of alternating layers of gallium arsenide and gallium aluminum arsenide. Radiation from an optical fiber is focused on the light modulator, preferably using an input lens. Generally, the optical absorption of the light modulator is proportional to the current through the device. Whatever radiation is not absorbed is transmitted and focused on an optical fiber, preferably using an output lens. A small, fixed portion of the transmitted radiation is directed to the photodetector, preferably via a beam splitter. Preferably, the output of the photodetector circuit is applied to a comparator which compares the signal from the photodetector circuit to a reference signal to provide a controller output to the current mirror to determine the current applied to the light modulator.

Preferably, the attenuator includes a plurality of MQWS devices, which the light passes through in series. Each MQWS device may be controlled by a separate control circuit, or a single control circuit may control all of the MQWS devices. The MQWS devices may be stacked; that is, all MQWS devices may be arranged serially along a line perpendicular to the layers of the MQWS.

Alternatively, the plurality of MQWS devices may be planar; that is, the MQWSs are all formed by the same GaAs and GaAlAs layers, with etched wells separating the devices. In this embodiment, optical prisms pass the radiation from one MQWS device to the next.

Preferably, a plurality of MQWS attenuators are formed into an array of MQWS channels between an optical demultiplexer and an optical multiplexer. The optical demultiplexer separates the input radiation into a spectrum of subbeams of different wavelengths, and each wavelength is passed through a different one of the MQWS attenuator channels. As known in the art, the attenuation wavelength of a MQWS device is determined by the thickness and materials, including dopings, of the MQWS layers. Each MQWS attenuator channel is designed to attenuate at a different narrow range of wavelengths, and preferably, is separately regulated. Each MQWS channel may be formed by a single MQWS attenuator. However, preferably, each channel is formed by a plurality of MQWS attenuators. The plurality of attenuators in each channel may be either stacked or planar.

In the most preferred form of the apparatus, the invention provides an optical attenuator for attenuating a light beam, the optical attenuator comprising: a multiple quantum well structure (MQWS), and an electro-optical feedback system responsive to the attenuated light beam and electrically connected to the MQWS for regulating the optical absorption of the MQWS.

In the most preferred form of the method, the invention provides a method of attenuating a light beam, the method comprising: providing a multiple quantum well structure (MQWS); directing a beam of light onto the MQWS; attenuating the light beam in the MQWS; exiting the light beam from the MQWS; directing a portion of the exit light beam onto an optical detection system, which in a simple case can be a photodetector, to provide a feedback signal; and utilizing the feedback signal to regulate the current in, and thus the attenuation power of, the MQWS.

In a preferred application of the attenuator, the invention provides an optical amplifier system that gives rise to an amplified optical beam, preferably with equal power across a whole spectrum. Preferably, the amplifier comprises: an optical amplifier; a multiple quantum well structure (MQWS); and an electrical circuit for supplying an electric current across the MQWS. Preferably, a plurality of MQWS attenuators are combined with an optical amplifier, such as an erbium-doped fiber amplifier (EDFA), to form an optical amplifier having a regulated output that is flatter than the typical output of an EDFA. Preferably, each of the attenuators is designed to attenuate at a different wavelength over the range of wavelengths amplified by the EDFA. In one embodiment, the plurality of MQWS attenuators are placed in series, and a variable grating, a photodetector, a sequencer and a multiplexer are used to sequentially tune each of the attenuators. In another embodiment, the attenuators are planar and are placed between an optical demultiplexer and an optical multiplexer, forming a plurality of attenuator channels which are separately regulated and then recombined at the optical multiplexer.

This invention provides a reliable dynamically variable optical attenuator that is polarization independent and that has a response time on the order of 10 nanoseconds (ns). In addition, the attenuator is completely solid state, can be fabricated via a mature manufacturing process, and is extremely compact in size. The extremely fast response time results in stable locking of the optical output signal. Numerous other features, objects and advantages of the invention will become apparent from the following description when read in conjunction with the accompanying drawings.

DETAILED DESCRIPTION OF THE PREFERRED EMBODIMENT

Figure 1:
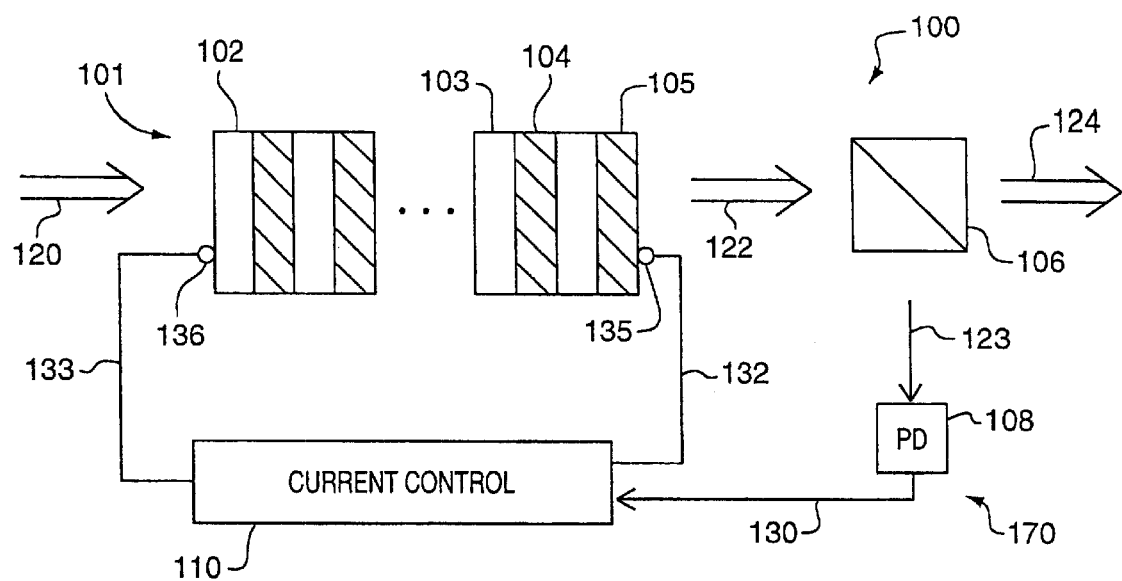
FIG. 1 is a schematic diagram of an optical attenuator according to the invention.

FIG. 1 is a schematic diagram of an optical attenuator 100 according to the invention. Attenuator 100 comprises a multiple quantum well structure (MQWS) 101 and an electro-optical feedback system 170 comprising a beam splitter 106, a photodetector 108, and a current control circuit 110. MQWS 101 comprises a stack of alternating layers of different materials 103 and 104. Preferably, layers 103 are gallium arsenide and layers 104 are gallium aluminum arsenide. Each of layers 103 and 104 are preferably less than 10 nanometers (nm) thick. Typically, a single MQWS includes two hundred or more layers 103 and 104, which is indicated in FIG. 1 by a beginning 102 and end 105 portion of the MQWS 101 connected by a series of dots. As known in the art, MQWS 101 absorbs light at a narrow wavelength determined by the energy levels of the structure, which energy levels are determined by the thickness of the layers, the materials of the layers, and in particular, the doping of the layers. Beam splitter 106 is generally intended to represent any device or arrangement which results in a portion of the beam 122 exiting the MQWS being intercepted by photodetector 108. Examples of such devices include a structure in which a mirror that reflects a part of the light and passes another part of the light is placed in the path of the beam 122, a structure in which a photodetector is placed in the path of a portion of the beam 122, a structure in which a portion of the beam is intercepted by a fiber and directed to photodetector 108, etc.

As indicated in FIG. 1, a light beam 120 is incident on MQWS 101, is attenuated in MQWS 101, and exits the MQWS as shown by beam 122. A portion 123 of beam 122 is intercepted by photodetector 108, and the rest forms the exit beam 124. The photodetector 108 provides a feedback signal 130 to current control 110. Current control 110 applies a current control signal to MQWS 102 via leads 132 and 133. As known in the art, the control signal is preferably applied to MQWS via contacts 135 and 136, which may be a suitably doped semiconductor or a conductor.

Figure 2:
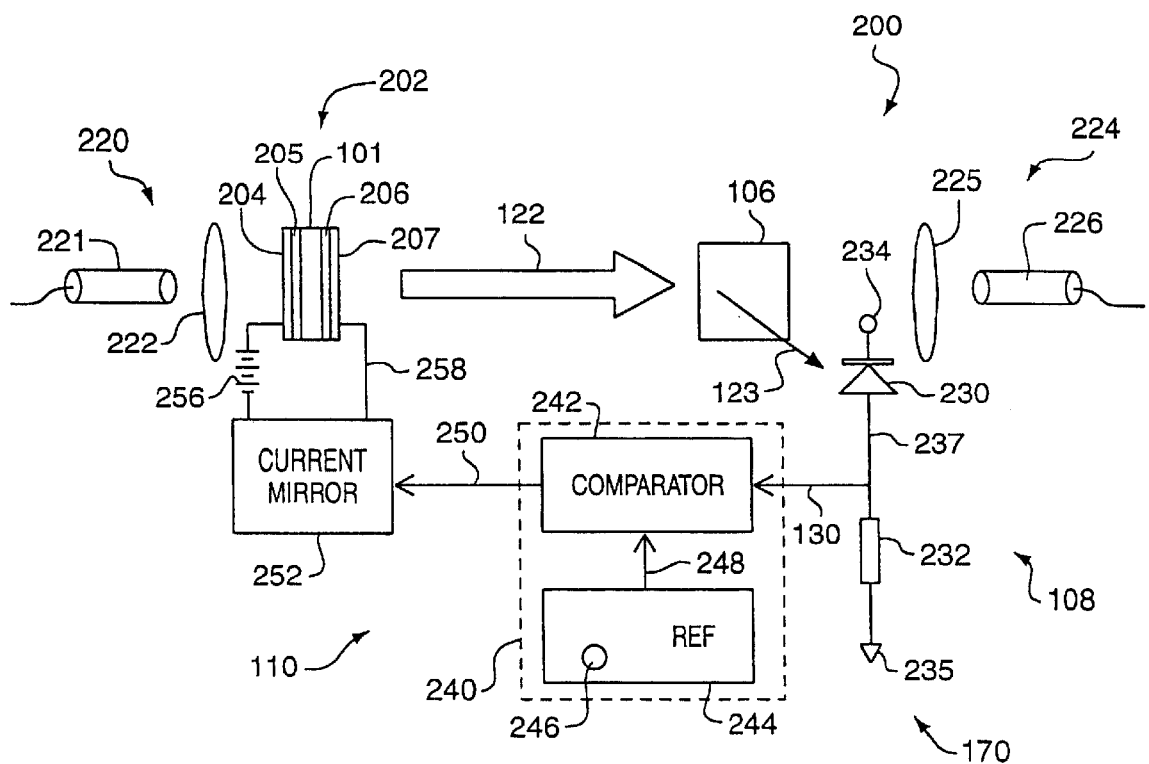
FIG. 2 shows a preferred embodiment of the optical attenuator of FIG. 1.

A preferred embodiment 200 of the attenuator of FIG. 1 is shown in FIG. 2. In this attenuator 200, the MQWS 101 is formed as part of a photo intrinsic diode or PIN structure 202. PIN structure 202 includes a p-doped semiconducting layer 205, an intrinsic layer 101, which comprises the MQWS, and an n-doped layer 206. A p-type layer 204 of GaAlAs serves as the one contact to the PIN, and an n-type layer 207 of GaAlAs serves as the other contact. Photodetector 108 comprises a photodiode 230 and a load resistor 232 connected in series between a voltage source 234 and a ground 235, with the cathode of the diode 230 connected to the voltage source 234 and the anode connected to the load 232. The feedback signal 130 is taken off the node 237 between the photodiode 230 and the load 232. The current control circuit 110 comprises a controller 240 and a current mirror 252. Controller 240 comprises comparator 242 and a variable source 244 of a reference voltage 248. Reference voltage source 244 includes a control 246 for setting the output reference voltage. Comparator 242 outputs a signal on line 250 which is mirrored by current mirror 252 to regulate the current across MQWS 101. As known in the art, current mirror 252 is essentially an amplifier in which the current at its output follows the current at its input, though the current level may be increased or decreased by a constant factor. A power source 256 provides the power to drive the current in the MQWS 101. An input port 220 comprising an input optical fiber and a focusing lens 222, and an output port 224 comprising a collection lens 225 and an output fiber 226 completes the attenuator 200. Lenses 222 and 225 are preferably gradient index (GRIN) lenses. The invention also contemplates that the MQWS can be incorporated into a SEED device. Lens 225 is optional. For a more complete description of an exemplary MQWS incorporated in a SEED and the operation thereof, see "The Quantum Well Self-Electrooptic Effect Device: Optoelectronic Bistability and Oscillation, and Self-Linearized Modulation", D. A. B. Miller et al., *IEEE, J. Quantum Electronics* QE21, 1462 (1985), which is hereby incorporated by reference to the same extent as though fully disclosed herein.

The attenuator 200 operates as follows. Light from the input fiber 221 is focused on LIGHT MODULATOR device 202 and is attenuated while passing through it, as discussed below. A portion 123 of the beam 122 exiting the LIGHT MODULATOR device 202 falls on photodiode 230, producing feedback signal 130. Preferably, the portion 123 is a small and fixed portion of light beam 122. Here, "small" means 25% or less of the beam 122. Comparator 242 compares the feedback signal 130 with the reference signal 248 and produces a regulating signal 250. Reference signal 248 may be either a voltage or current, but preferably is a current. The precise form and size of the reference signal 248 depend on the application of attenuator 200. In one application, it is determined by the maximum optical power acceptable to optical receivers in the system of which it is a part, or it could also be based on the optical power of the weakest optical channel in the system. In these cases, the optical attenuator 200 acts as an optical clipping device. In other applications, it is determined by the need to alter the optical signal passing through in relation to other optical signals. In this case, it acts as a modulator. Reference signal 248 in general is different for different wavelengths. For example, in the case where the optical attenuators are used in combination with an optical amplifier with a known gain for different wavelengths, then such different reference signals for different wavelengths are generally desirable.

As known in the art, the photocurrent in MQWS 101 is directly proportional to the electric current supplied by current source 256. The MQWS absorbs the incident light and converts it to photocurrent, and then reconverts it to the output beam 122. In response to the regulating signal 250, the current mirror 252 controls the current in MQWS 101 to control the output beam 122.

The response time of the attenuator 220 is dependent on the RC constant of the device and the drive circuitry and generally is 10 nanoseconds (ns) or less, which is about 100,000 times faster than other devices in development. It is also evident that attenuator 200 is polarization independent and, for all practical purposes, temperature independent. It is also completely solid state and is very small in volume. The control circuitry is linear circuitry and presents no difficulty in being incorporated into an integrated circuit chip.

Figure 3:
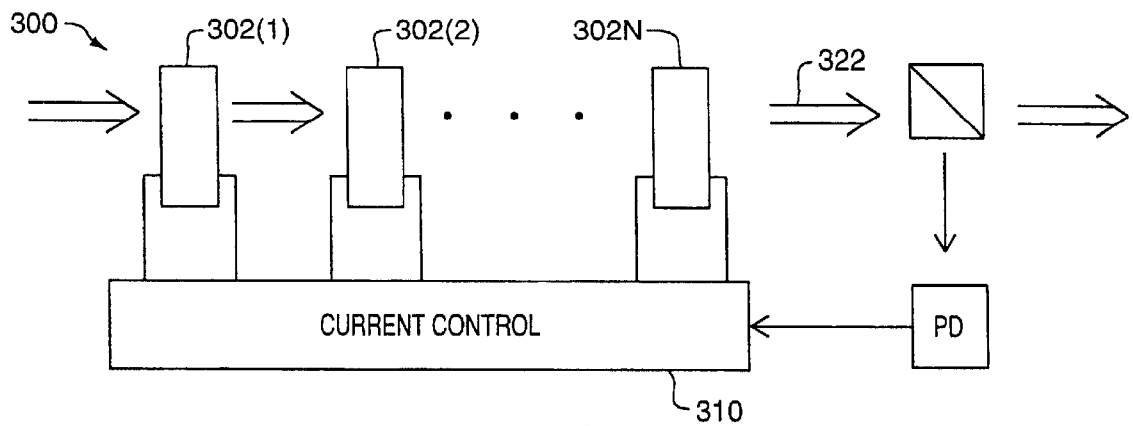
FIG. 3 is a schematic diagram of an optical attenuator with a plurality of stacked attenuator elements according to the invention.
Figure 4:
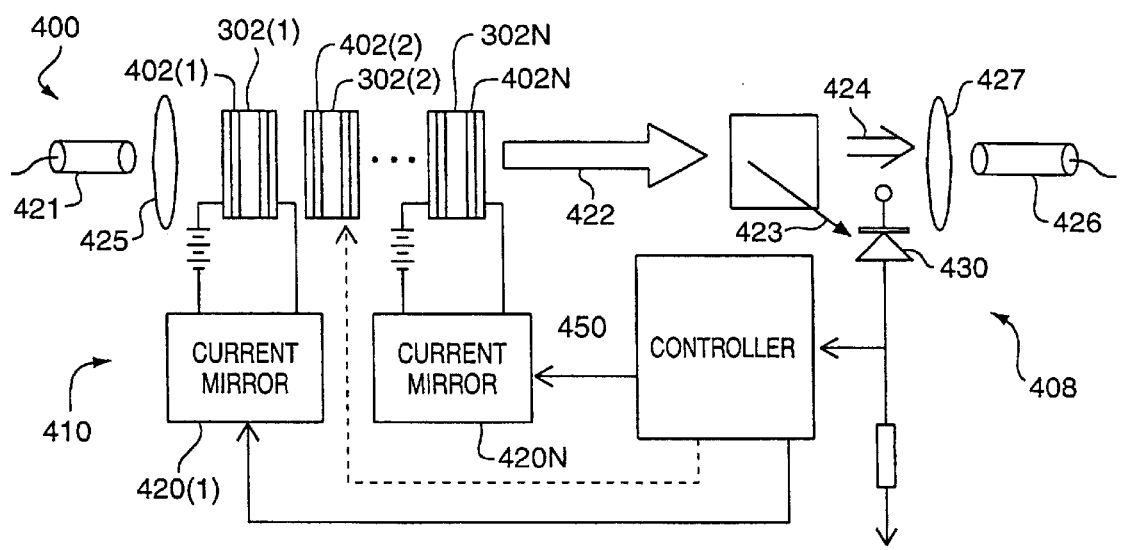
FIG. 4 shows a preferred embodiment of the optical attenuator of FIG. 3.

For control purposes or for applications where maximum attenuation cannot be easily obtained using a single MQWS device, multiple MQWS devices may be used to obtain the desired optical power attenuation. FIGS. 3 through 10 show a variety of different variable optical attenuators according to the invention which incorporate multiple MQWSs. FIG. 3 is a schematic diagram of an optical attenuator 300 with a plurality of stacked attenuator elements 302(1), 302(2) through 302N. The structure and operation of attenuator 300 is the same as that of attenuator 100 of FIG. 1, except for the multiple MQWS devices 302(1), etc., and changes to the current control circuit that reflect the multiple MQWS devices. Each MQWS device 302(1), etc., may be controlled by an individual control circuit within the current control circuit 310, or all of the MQWS devices can be controlled by the same control circuit. In other words, there may be substantially the same or different regulating currents flowing into each MQWS device. FIG. 4 shows a preferred embodiment of a stacked attenuator 400. In attenuator 400, each MQWS 302(1), etc., is incorporated into a PIN structure 402(1), 402(2) through 402N. The optical beam 422 exiting the devices 402(1), etc., is again split up into a major component 424 collected by a fiber 426 and a small and fixed component 423 monitored by a photodetector 430 that is part of the feedback control circuitry 410 that regulates the current flowing into the MQWS devices 302(1), etc. In attenuator 400, the attenuation in each MQWS device 302 (1), 302(2) through 302N is controlled by a separate current mirror 420(1), 420(2) through 420N. However, in other applications, all of the MQWS devices 302(1), etc., may be controlled by a single current mirror, or may be divided into groups, each group having a separate current mirror. The photodetector 408, the controller 410, current mirrors 420 (1), etc., operate as described above in connection with FIG. 2. Likewise, the other parts shown operate as described above.

Figure 5:
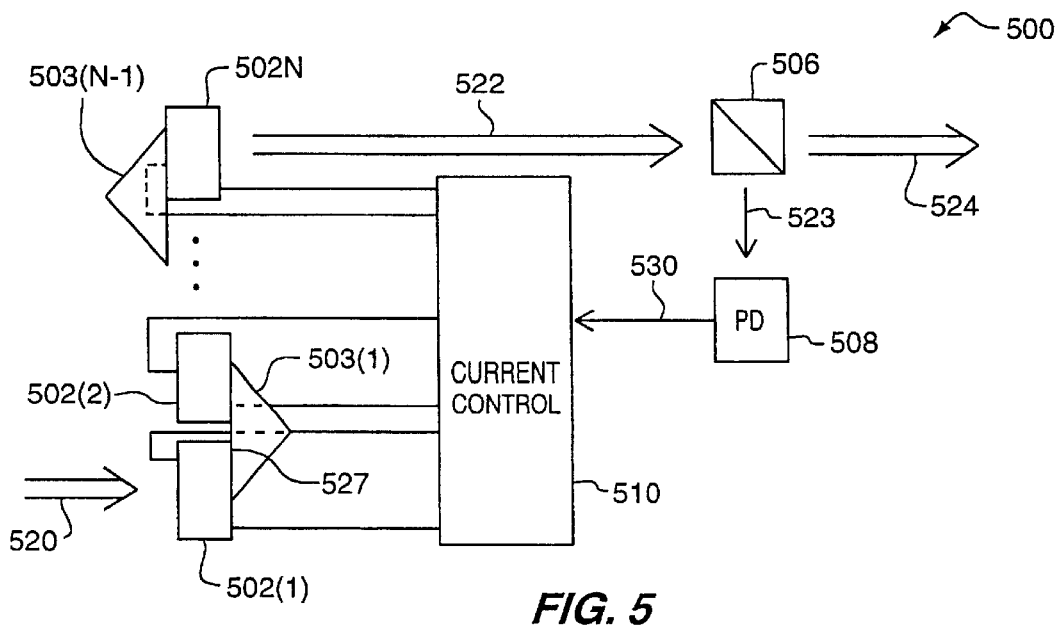
FIG. 5 is a schematic diagram of an optical attenuator according to the invention with a plurality of attenuator elements in a planar arrangement.

A schematic diagram of an attenuator 500 including a plurality of MQWSs 502(1), 502(2) through 502N forming a planar MQWS is shown in FIG. 5. Light is passed from each MQWS device 502(1) through 502(N-1) to the next MQWS device 502(2) through 502N by a prism 503(1) through 503(N-1). Like the other attenuators described above, a light beam 520 enters the first MQWS, is passed via prisms 503(1), etc., through the remainder of the MQWSs, 502(2) through 502N, exits as beam 522, a fixed portion 523 of which is directed to a photodetector circuit 508 and the rest of which 524 exits the attenuator 500. Photodetector circuit 508 provides a feedback signal 530 to a current control circuit 510 which controls the attenuation in MQWS devices 502(1), etc. As in the above attenuators, the planar attenuator structure 500 is preferably implemented with MQWS devices. The planar structure of the MQWS devices is fabricated by depositing the desired number of layers of the semiconducting materials, such as gallium arsenide and gallium aluminum arsenide, as shown in FIG. 1, and then etching wells, such as 527, to define the individual MQWS devices 502(1), 502(2), etc. This simplifies the process of making the MQWS devices, because the number of different layers that must be deposited is significantly reduced. It also makes the processing even more similar to current integrated circuit processing techniques.

Figure 6:
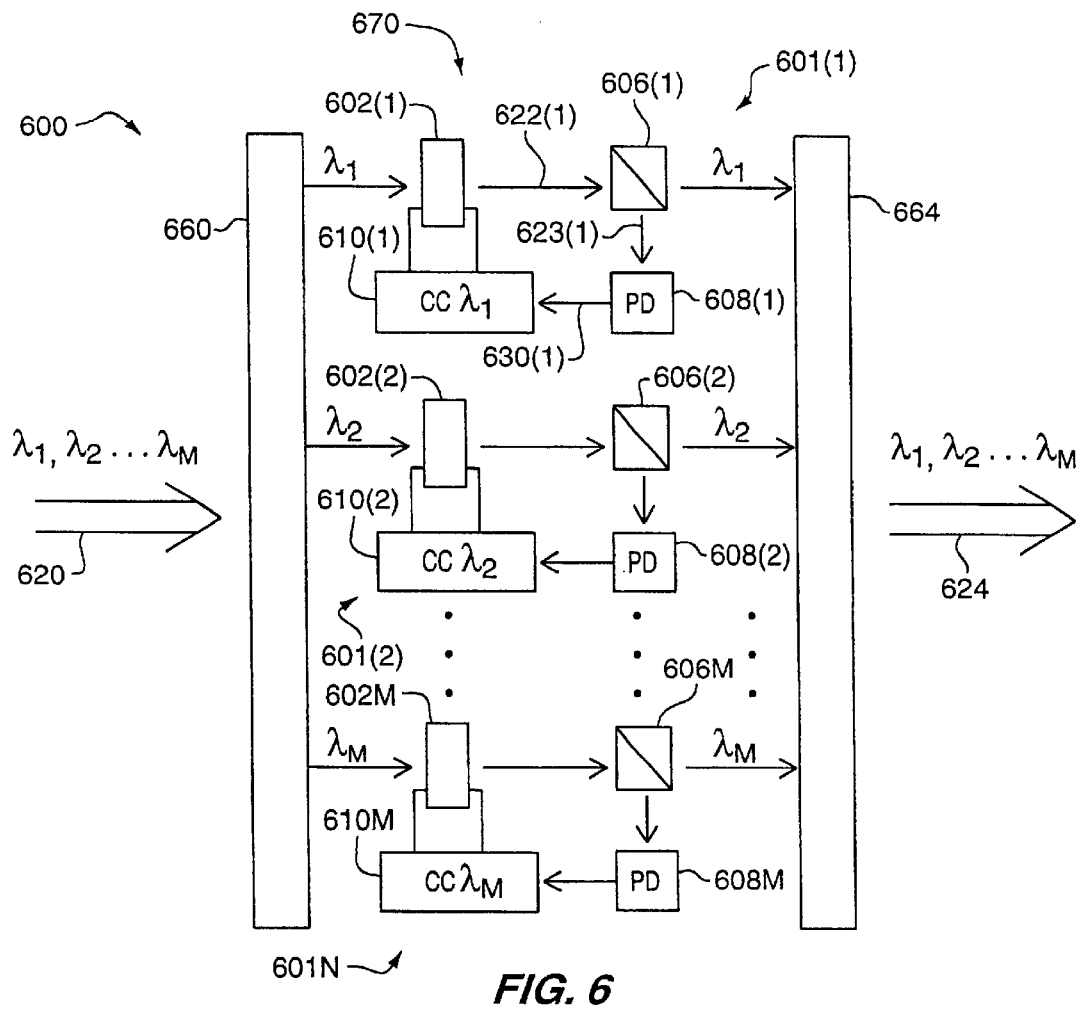
FIG. 6 is a schematic diagram of an attenuator spectrometer according to the invention.

Often optical devices, such as fiber optic systems, utilize many different wavelengths of light, each different wavelength carrying a different signal. In such applications, to utilize an array of attenuators, each attenuator is acting on a different wavelength. Such an attenuator system 600 is shown in FIG. 6. Attenuator system 600 comprises an optical demultiplexer 660, an attenuator array 670, and an optical multiplexer 664. An input optical beam 620 comprising a plurality of wavelengths $\lambda_1$, $\lambda_2$ through $\lambda_M$ is separated into a plurality of different wavelength subbeams $\lambda_1$, $\lambda_2$, through $\lambda_M$, attenuated by array 670, then recombined into a single light beam 624 including all the wavelengths $\lambda_1$, $\lambda_2$ through $\lambda_M$. Preferably, demultiplexer 660 and multiplexer 664 are optical wavelength division multiplexing (WDM) devices.

Attenuator array 670 comprises a plurality of attenuators, 601(1), 601(2) through 601M, each of which is essentially identical to the attenuator 100 of FIG. 1, except that each attenuator 601(1), etc., is fabricated to attenuate a different wavelength. Each attenuator 601(1), etc., includes an MQWS device 602(1), etc., a beam splitter 606(1), etc., a photodetector circuit 608(1), etc., and a current controller, 610(1), etc. In each of the attenuators, such as 601(1), the input beam, such as $\lambda_1$, is incident on the MQWS, such as 602(1), is attenuated as determined by its current control circuit, such as 610(1), a fixed portion, such as 623(1), of the beam, such as 622(1), exiting the MQWS is directed to the photodetector circuit, such as 608(1), which produces a feedback signal, such as 630(1), which feedback signal is input into the current control, such as 610(1), to provide feedback to regulate the attenuation. In this manner, each wavelength $\lambda_1$, $\lambda_2$ through $\lambda_M$ is separately attenuated. Such an attenuator system 600 is useful as a spectrum equalizer, where the input optical power with arbitrary power distribution over different wavelengths are regulated so that the output optical power is equal for each wavelength. Of course, the array can be designed so that the optical power as a function of wavelength can be in any predetermined pattern. The preferred embodiment of attenuator 600 is implemented with PIN devices.

The attenuator array 670 of FIG. 6 utilizes planar MQWSs. That is, like the MQWSs of FIG. 5, the MQWSs can be made by depositing sufficient layers as necessary for the desired MQWS, then etching wells in the layers to form the separate MQWSs 602(1), etc. An alternative embodiment of a multiwavelength attenuator 700 using a stacked attenuator array 770 is show in FIG. 7. Attenuator 700 includes a stacked series of MQWSs 702(1), 702(2) through 702M, each having its own current control circuit 710(1), 710(2) through 710M, respectively. Each of MQWS devices 702(1), 702(2) through 702N is fabricated to absorb at a different one of wavelengths $\lambda_1$, $\lambda_2$ through $\lambda_M$ Preferably, for each control circuit 710(1), 710(2) through 710M, there is a corresponding photodetector circuit 708(1), 708(2) through 708M, respectively, which provides a feedback signal on lines 723(1), 723(2) through 723M, respectively. An input beam 720 having wavelengths $\lambda_1$, $\lambda_2$ through $\lambda_M$ is incident on the serial array 770, is attenuated by MQWSs 702(1), 702(2) through 702M, and exits as attenuated beam 722, a small, fixed portion 723 of which is directed at optical demultiplexer 760, and the rest of which forms exit beam 724 also having wavelengths $\lambda_1$, $\lambda_2$ through $\lambda_M$. Demultiplexer 760 separates beam 723 into its component wavelengths $\lambda_1$, $\lambda_2$ through $\lambda_M$ to form subbeams 780 having wavelengths $\lambda_1$, $\lambda_2$ through $\lambda_M$, each of which is incident on one of photodetector circuits 708(1), 708(2) through 708N. Each current control circuit 710(1), 710(2) through 710M utilizes its feedback signal to regulate the current in its corresponding MQWS 702(1), 702(2) through 702M, respectively. Since each MQWS 702(1), 702(2) through 702M passes any light it does not absorb, attenuator 700 also separately attenuates each wavelength.

Figure 7:
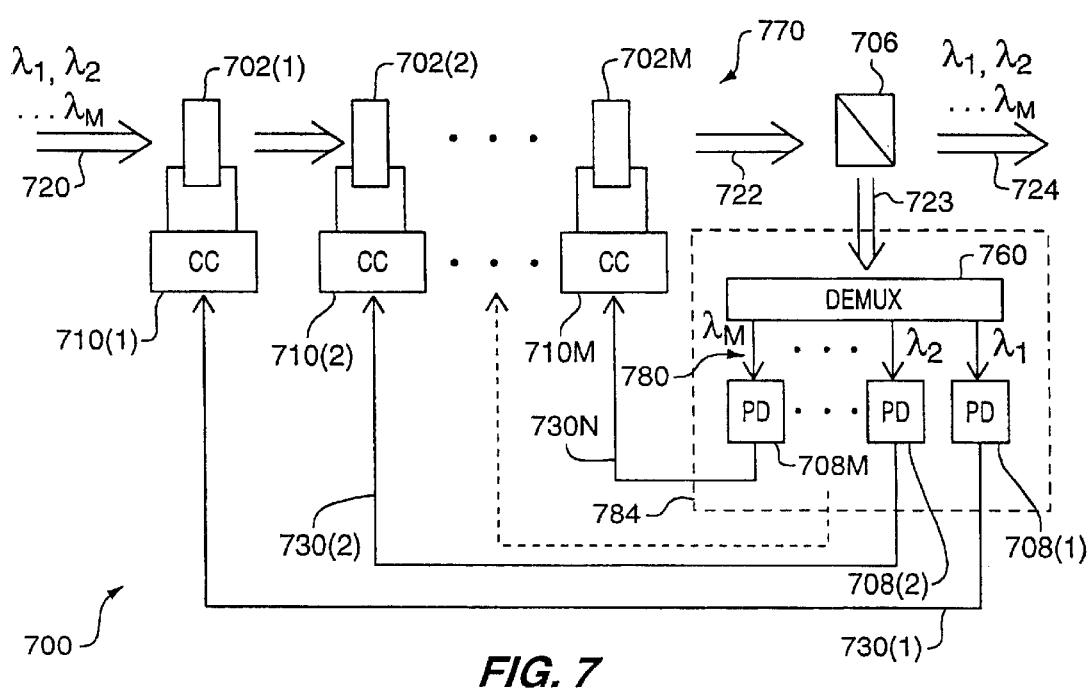
FIG. 7 is a schematic diagram of an alternative embodiment of an attenuator spectrometer according to the invention.
Figure 8:
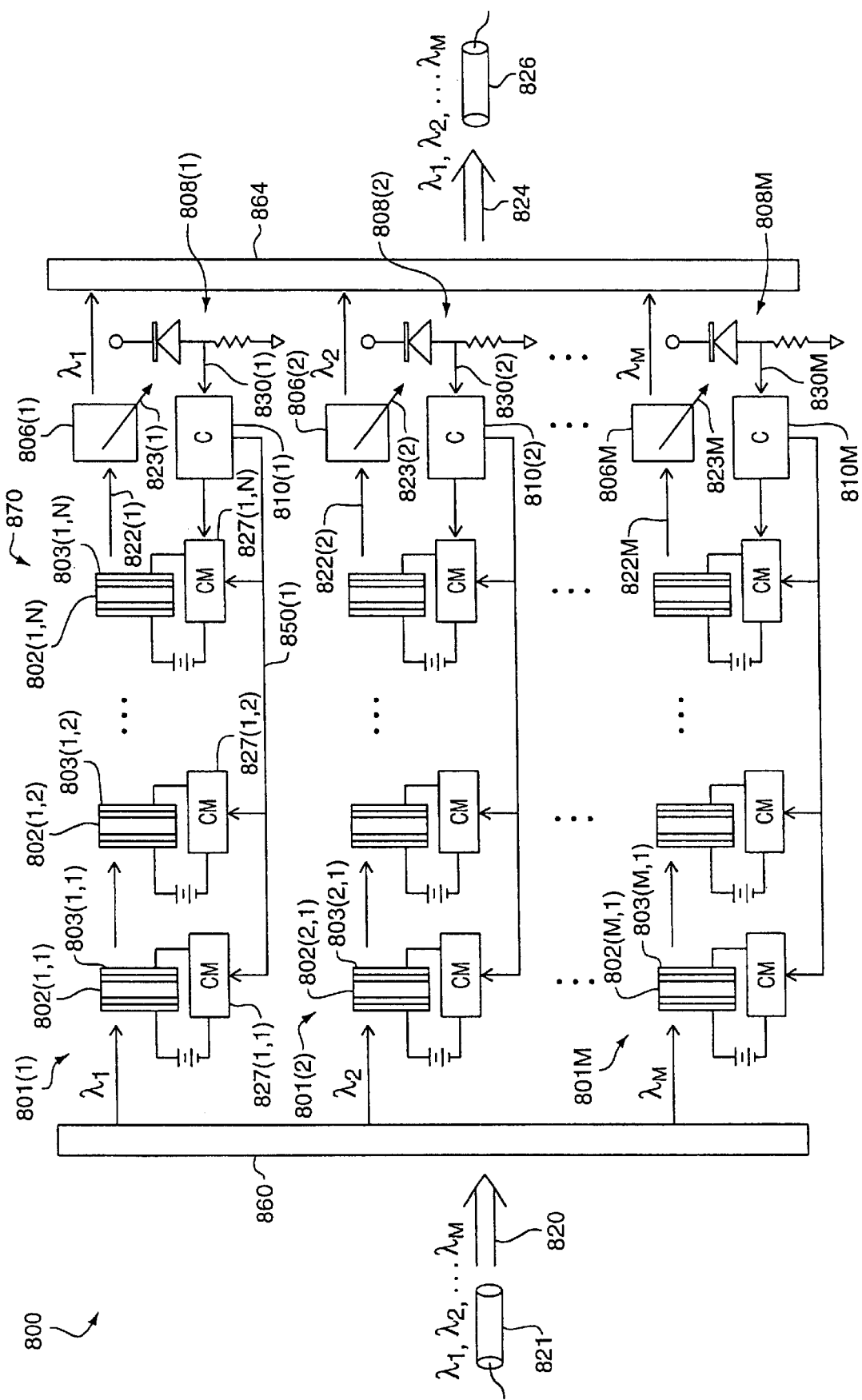
FIG. 8 shows a preferred embodiment of an attenuator spectrometer according to the invention having N channels with a plurality of stacked attenuator elements in each channel.

Each of the optical attenuators 600 and 700 shown in FIGS. 6 and 7 utilizes a single MQWS for each wavelength. The multiple wavelength attenuator array can be easily extended to an array using multiple MQWS devices to regulate the optical power for each wavelength channel. This extension is straightforward in the case of a stacked structure as shown in FIG. 8. This figure shows an attenuator system 800 comprising an optical demultiplexer 860, an attenuator array 870, and an optical multiplexer 864. An input optical beam 820 from fiber 821, which beam comprises a plurality of wavelengths $\lambda_1$, $\lambda_2$ through $\lambda_M$, is separated into a plurality of different wavelength bundles, $\lambda_1$, $\lambda_2$ through $\lambda_M$, attenuated by array 870, then recombined into a single light beam 824 including all the wavelengths $\lambda_1$, $\lambda_2$ through $\lambda_M$. Preferably, demultiplexer 860 and multiplexer 864 are optical wavelength division multiplexing (WDM) devices.

Attenuator array 870 comprises a plurality of attenuators, 801(1), 801(2) through 801M, each of which is similar to the attenuator 400 of FIG. 4, except that individual fibers 421 and 426 and lenses 425 and 427 are not included, and that each attenuator 801(1), etc., is fabricated to attenuate a different wavelength. Each attenuator 801(1), etc., includes a plurality of MQWS devices 802(1, 1), 802(1, 2), etc., which, in this embodiment, are embedded in a PIN diode to form light modulator devices 803(1, 1), 803(1, 2) etc. Each attenuator 801(1), etc., also includes a beam splitter 806(1), etc., a photodetector circuit 808(1), etc., and a controller, 810(1), etc. Each attenuator, such as 801(1), includes N MQWS devices. For each attenuator, such as 801(1), input beam, such as $\lambda_1$, is incident on the MQWS, such as 802(1, 1), is attenuated as determined by its current control circuit, such as 810(1), a fixed portion, such as 823(1), of the beam, such as 822(1), exiting the MQWS is directed to the photodetector circuit, such as 808(1), which produces a feedback signal, such as 830(1), which feedback signal is input into the controller, such as 810(1). The controller, such as 810(1) provides a regulator signal, such as 850(1), to each of N current mirrors, 827(1, 1), 827(1, 2) through 827(1, N). Each current mirror, such as 827(1, 1), mirrors the input current to regulate the attenuation of its corresponding MQWS device, such as 802(1, 1). In this manner, each wavelength $\lambda_1$, $\lambda_2$ through $\lambda_M$ is separately attenuated by N MQWS devices. Alternatively, one current mirror could be used for all MQWS devices in a row.

Figure 9:
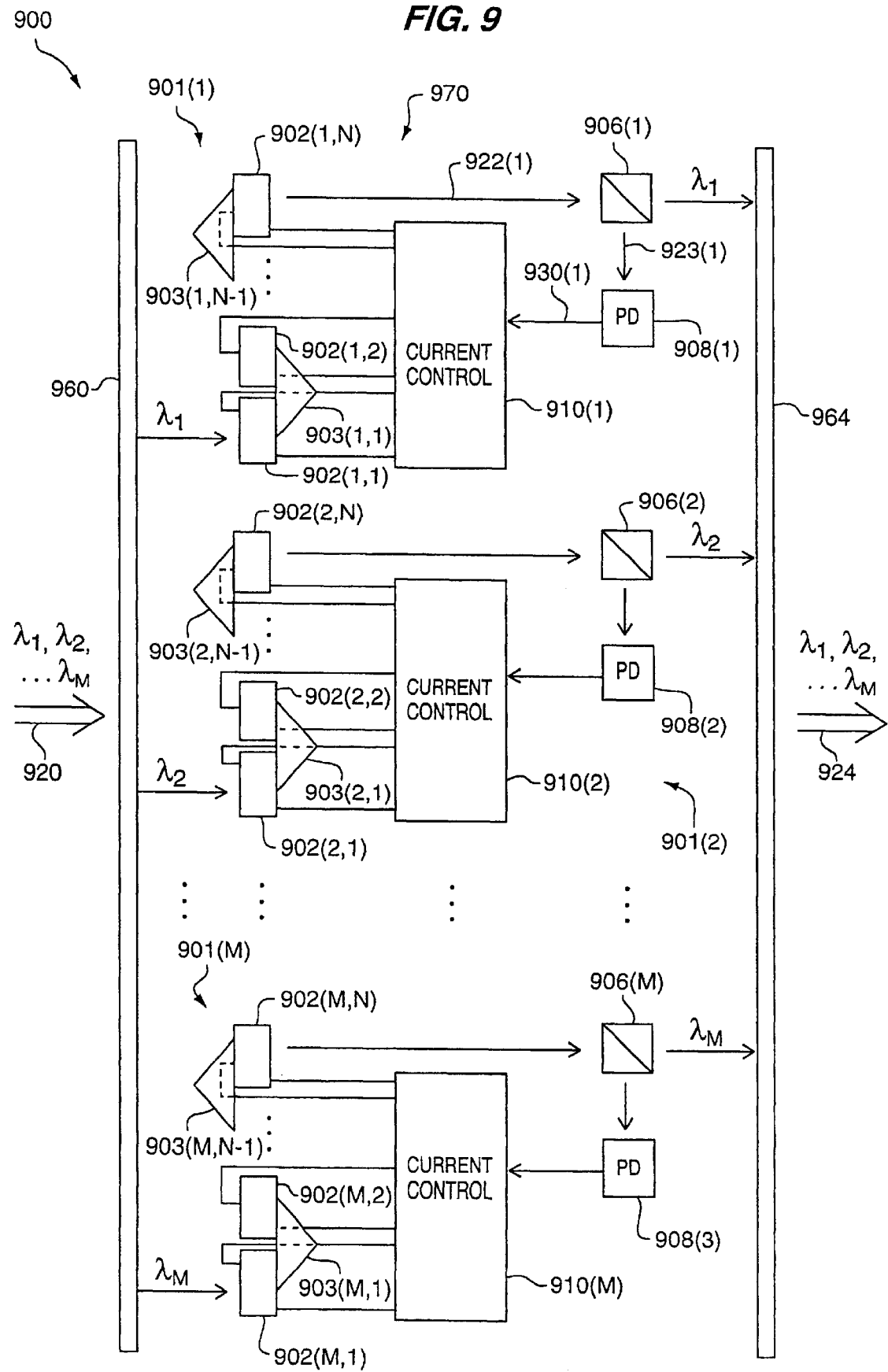
FIG. 9 is a schematic diagram of an alternative preferred embodiment of an attenuator spectrometer according to the invention having N channels with a plurality of planar attenuator elements in each channel.

FIG. 9 shows an attenuator system having multiple MQWS devices for each wavelength, and having a planar structure. The MQWS devices for each wavelength are grouped and prisms are used to direct the exiting light from one MQWS device into the next. Attenuator system 900 comprises an optical demultiplexer 960, an attenuator array 970, and an optical multiplexer 964. An input optical beam 920, which comprises a plurality of wavelengths $\lambda_1$, $\lambda_2$ through $\lambda_M$, is separated into a plurality of different wavelength bundles, $\lambda_1$, $\lambda_2$ through $\lambda_M$, attenuated by array 970, then recombined into a single light beam 924 including all the wavelengths $\lambda_1$, $\lambda_2$ through $\lambda_M$. Preferably, demultiplexer 960 and multiplexer 964 are optical wavelength division multiplexing (WDM) devices.

Attenuator array 970 comprises a plurality of attenuators, 901(1), 901(2) through 901M, each of which is essentially identical to the attenuator 500 of FIG. 5, except that each attenuator 901(1), etc., is fabricated to attenuate a different wavelength. Each attenuator 901(1), etc., includes a plurality of MQWS devices 902(1, 1), 902(1, 2), etc. Each attenuator 901(1), etc., also includes a beam splitter 906(1), etc., a photodetector circuit 908(1), etc., and a current control circuit, 910(1), etc. Each attenuator, such as 901(1), includes N MQWS devices. In each attenuator, such as 901(1), light is passed from one of the N MQWS devices to the next by prisms, such as 903(1, 1), 903(1, 2) through 903(1, N−1). For each attenuator, such as 901(1), input beam, such as $\lambda_1$, is incident on the MQWS, such as 902(1, 1), and is attenuated as it passes through the MQWS in an amount determined by the corresponding current control circuit, such as 910(1). After the light exits the last MQWS, such as 901(1, N), a fixed portion, such as 923(1), of the beam, such as 922(1), exiting the MQWS is directed to the photodetector circuit, such as 908(1), which produces a feedback signal, such as 930(1), which feedback signal is input into the current control circuit, such as 910(1). The current control circuit, such as 910(1), provides a regulator signal, such as 950(1), to each of N MQWSs, 902(1, 1), 902(1, 2) through 902(1, N), to regulate the attenuation. In this manner, each wavelength $\lambda_1$, $\lambda_2$ through $\lambda_M$ is separately attenuated by N MQWS devices. As in the other embodiments, the MQWS devices can be incorporated into PIN light modulator devices, and the current control circuit, such as 910(1), can be implemented as a reference signal generator and a comparator, plus one or more current mirrors. As in a previous embodiment, alternatively, a small portion of the exiting light could be directed to a demultiplexer and then to photodetectors to provide feedback.

Figure 10:
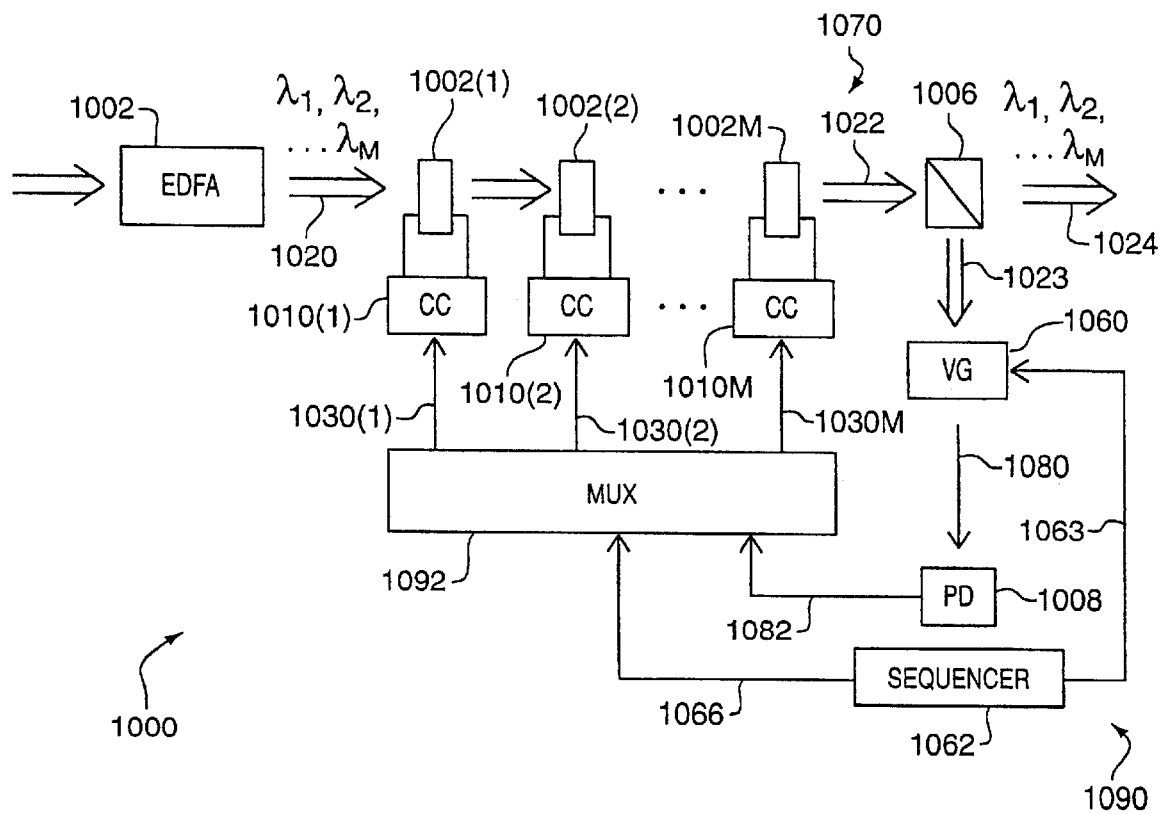
FIG. 10 is a schematic diagram of an optical amplifier according to the invention.

Turning to FIG. 10, a schematic diagram of an optical amplifier 1000 according to the invention is shown. Amplifier 1000 includes an optical amplifier 1002 and attenuator 1004, in series. The optical amplifier 1002 is preferably an erbium-doped fiber amplifier (EDFA) 1002, but may also be a semiconducting optical amplifier (SOA). Erbium-doped fiber amplifiers and semiconducting optical amplifiers are well-known in the art, and thus the details of the optical amplifier 1002 will not be discussed herein. Attenuator 1004 is similar to attenuator 700 shown in FIG. 7 in that it includes stacked series 1070 of MQWSs 1002(1), 1002(2) through 1002M, each having its own current control circuit 1010(1), 1010(2) through 1010M, respectively. Each of these control circuits is essentially an electrical circuit for applying an electric current across its corresponding MQWS. As in the attenuator 700, each of MQWS devices 1002(1), 1002(2) through 1002N is fabricated to absorb at a different one of wavelengths $\lambda_1$, $\lambda_2$ through $\lambda_M$. However, instead of having a corresponding photodetector circuit for each control circuit, preferably an electro-optical demultiplexer system is used. Electro-optical demultiplexer system 1090 includes an optical demultiplexer, such as variable grating 1060, a photodetector 1008, a sequencer 1062 and an electrical multiplexer 1092. Variable grating 1060 is controlled by sequencer 1062 via line 1063 to sequentially separate the wavelengths $\lambda_1$, $\lambda_2$ through $\lambda_M$ and present them one at a time and sequentially to photodetector 1008. Sequencer 1062 also controls multiplexer 1092 via line 1066 to gate the output of photodetector 1008 on line 1082 sequentially to each of current control circuits 1010(1), 1010(2) through 1010(M). As in attenuator 700, an input beam 1020 having wavelengths $\lambda_1$, $\lambda_2$ through $\lambda_M$ is incident on the serial array 1070, is attenuated by MQWSs 1002(1), 1002(2) through 1002M, and exits as attenuated beam 1022, a small, fixed portion 1023 of which is directed at variable grating 1060, and the rest of which forms exit beam 1024 also having wavelengths $\lambda_1$, $\lambda_2$ through $\lambda_M$. Grating 1060 separates beam 1023 into its component wavelengths $\lambda_1$, $\lambda_2$ through $\lambda_M$, one at a time. When the wavelength $\lambda_1$ is passed by variable grating 1060 and is incident on photodetector 1008, the feedback signal from photodetector 1008 on line 1082 is passed to current controller 1010(1) which utilizes it to regulate MQWS device 1002(1), which is the MQWS which is designed to attenuate the wavelength $\lambda_1$. Similarly, as each wavelength $\lambda_2$ through $\lambda_M$ is presented to photodetector 1008, the feedback signal on line 1082 is multiplexed to the appropriate one of current controllers 1002(2) through 1002(M) which regulates the one of MQWSs 1002(2) through 1002(M) which is designed to attenuate that wavelength. Each current control circuit 1010(1), 1010(2) through 1010M utilizes its feedback signal to regulate the current in its corresponding MQWS 1002(1), 1002(2) through 1002M, respectively. Since each MQWS 1002(1), 1002(2) through 1002M passes any light it does not absorb, attenuator 1004 separately attenuates each wavelength $\lambda_1$, $\lambda_2$ through $\lambda_M$ as it exits from EDFA 1002. Preferably, each current control circuit 1010(1), 1010(2) through 1010(M) sequentially receives a feedback signal which it uses to regulate its corresponding MQWS. Preferably, each current control circuit continues to regulate its corresponding MQWS based on the latest feedback signal, until the next feedback signal is received.

Figure 11:
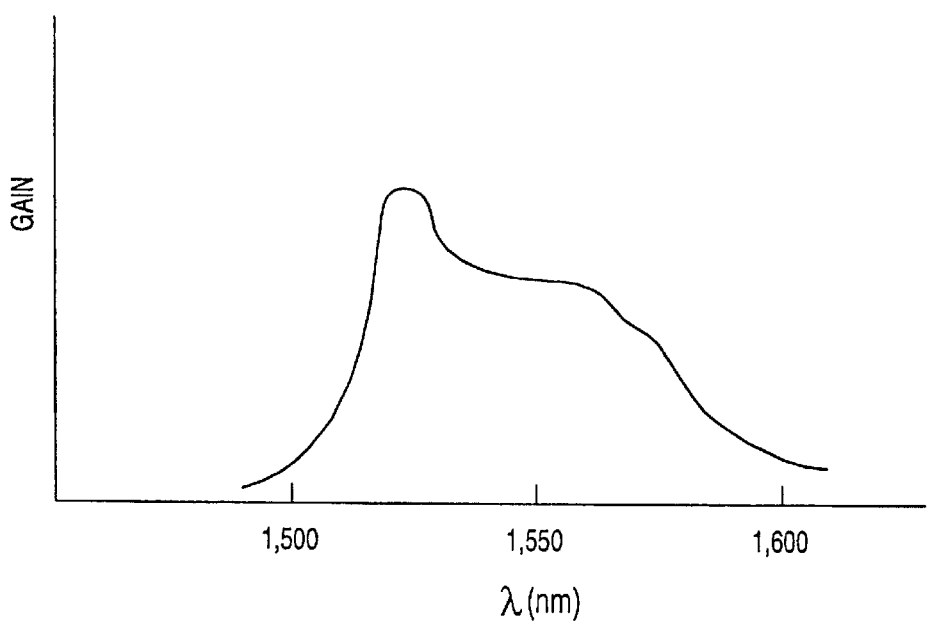
FIG. 11 is a graph of the gain as a function of wavelength of the EDFA portion of the amplifier of FIG. 10.
Figure 12:
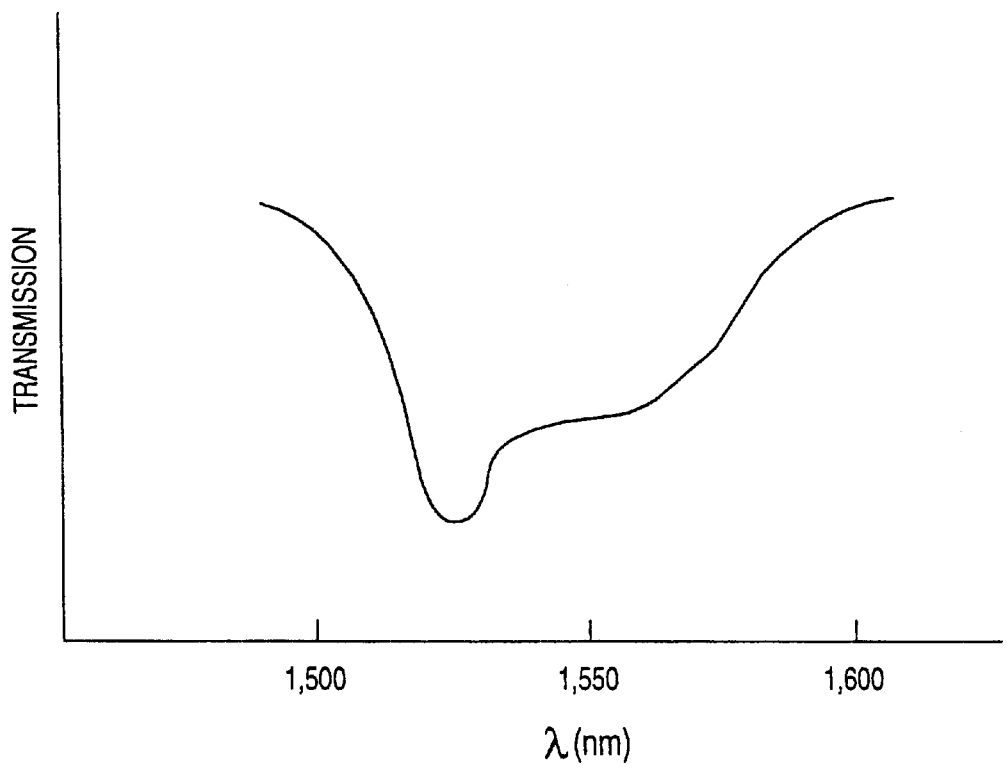
FIG. 12 is a graph of the transmission as a function of wavelength of the attenuator portion of the amplifier of FIG. 10.
Figure 13:
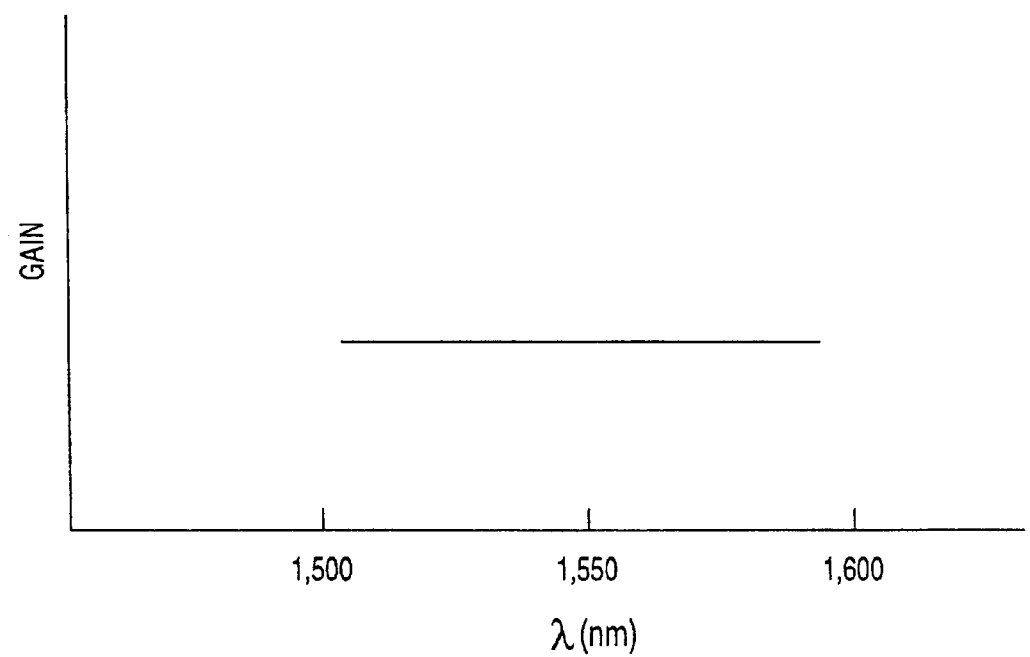
FIG. 13 shows the net gain as a function of wavelength of the amplifier of FIG. 10.

FIG. 11 is a graph of the gain as a function of wavelength of the EDFA portion of the amplifier of FIG. 10. The gain is strongly dependent on wavelength; thus, without modulation, the energy in the beam 1020 exiting EDFA is strongly wavelength dependent. FIG. 12 is a graph of the transmission as a function of wavelength of the attenuator portion 1004 of the amplifier of FIG. 10. The attenuator 1004 is designed so that the transmission curve of FIG. 12 mirrors the gain curve of FIG. 11, with the result that the net gain of the amplifier 1000 is essentially flat as a function of wavelength, as shown in FIG. 13.

The electro-optical demultiplexer system 1090 described in connection with FIG. 10 may be used in any of the other embodiments described above which attenuate a spectrum of wavelengths. This system is slower to adjust the attenuation than optically multiplexed systems that use multiple photodetectors simultaneously, such as the attenuator 700, but this is not a significant disadvantage when the beam being attenuated is relatively stable, such as the output of an EDFA. Similarly, if more speed is desired in the attenuator 1000, the feedback system 784 in FIG. 7, which simultaneously demultiplexes all of the wavelengths, can be used instead of the electro-optical demultiplexer 1090. Likewise, it should be understood that any of the various portions or embodiments of any of the attenuators and attenuator systems described above can be combined with any of the other portions or embodiments described in instances where the combination has evident usefulness or an evident advantage. In particular, any of the attenuator embodiments of FIGS. 1–9, or portions thereof, may be combined with the optical amplifier 1002 of FIG. 10.

It should further be understood that the electro-optical feedback circuit 1090 is not required for an amplifier according to the invention, but is shown as the preferred embodiment. That is, if the gain curve of the optical amplifier 1002 is stable and the absorption of the MQWS, such as 1002(1), at a given wavelength is stable, then an amplifier can be designed that utilizes only the amplifier, one or more MQWSs, and one or more circuits, such as 1010(1), for applying an electrical field across the MQWS.

There has been described a novel optical attenuator that is reliable, fast, small, and can be manufactured with integrated circuit fabrication techniques. It should be understood that the particular embodiments shown in the drawings and described within this specification are for purposes of example and should not be construed to limit the invention which will be described in the claims below. Further, it is evident that those skilled in the art may now make numerous uses and modifications of the specific embodiments described, without departing from the inventive concepts. It is also evident that equivalent structures and processes may be substituted for the various structures and processes described. A variety of different implementations of the circuits may be used, or the signals discussed may in some instances occur in a different order. Consequently, the invention is to be construed as embracing each and every novel feature and novel combination of features present in and/or possessed by the optical attenuator described.

We claim:

1. An optical attenuator for attenuating a light beam, said optical attenuator comprising:
   a plurality of multiple quantum well structures (MQWSs); and
   an electro-optical feedback system responsive to said attenuated light beam and electrically connected to said MQWSs for regulating the optical absorption of said MQWSs;
   wherein said plurality of MQWSs are formed into a plurality of groups of MQWSs, each group containing a plurality of MQWSs, each of said plurality of MQWSs in each group designed to attenuate at essentially the same wavelength, and each group designed to attenuate at a different wavelength.

2. An optical attenuator as in claim 1 wherein said MQWS forms part of a photo intrinsic diode (PIN) structure a self-electro-optic effect device (SEED).

3. An optical attenuator as in claim 1 wherein each of said MQWSs are designed to attenuate at a different wavelength.

4. An optical attenuator as in claim 3 wherein said wavelengths range from 800 nm to 2000 nm.

5. An optical attenuator as in claim 1 wherein said plurality of MQWSs are stacked so that the light to be attenuate passes through them serially.

6. An optical attenuator as in claim 1 wherein said plurality of MQWSs each include a plurality of semiconducting layers, and said MQWSs are aligned in a plane parallel to said layers.

7. An optical attenuator as in claim 6, and further including a prism for passing light from one of said plurality of MQWSs to the next MOWS.

8. An optical attenuator as in claim 1 wherein said MQWS forms part of a self-electro-optic effect device (SEED).

9. An optical attenuator for attenuating a light beam, said optical attenuator comprising:
   a plurality of multiple quantum well structures (MQWSs); and
   an electro-optical feedback system responsive to said attenuated light beam and electrically connected to said MQWS for regulating the optical absorption of said QWSs;
   and further including an optical demultiplexer for separating said beam into a plurality of different wavelengths.

10. An optical attenuator as in claim 9, and further including an optical multiplexer for recombining said plurality of different wavelengths into a beam having multiple wavelengths.

11. An optical attenuator for attenuating a light beam, said optical attenuator comprising;
    a multiple quantum well structure MQWS; and
    an electro-optical feedback system responsive to said attenuated light beam and electrically connected to said MQWS for regulating the optical absorption of said MQWS;
    wherein said electro-optical feedback system comprises a photodetector for producing a feedback signal, a beam splitter for directing a portion of said attenuated light beam to said photodetector, and an optical demultiplexer.

12. An optical attenuator as in claim 11 wherein as electro-optical feedback system further includes a source of a reference signal and a comparator for comparing said reference signal to said feedback signal.

13. An optical attenuator for attenuating a light beam, said optical attenuator comprising:
    a multiple quantum well structure (MQWS); and
    an electro-optical feedback system responsive to said attenuated light beam and electrically connected to said MQWS for regulating the optical absorption of said MQWS;
    wherein said electro-optical feedback system comprises a photodetector for producing a feedback signal, a beam splitter for directing a portion of said attenuated light beam to said photodetector, and an optical grating.

14. An optical attenuator for attenuating a light beam, said optical attenuator comprising:
    a multiple quantum well structure (MQWS); and
    an electro-optical feedback system responsive to said attenuated light beam and electrically connected to said MQWS for regulating the optical absorption of said MQWS;
    wherein said electro-optical feedback system comprises a current mirror.

15. A method of attenuating a light beam, said method comprising:
    providing a plurality of multiple quantum well structures (MQWSs), each of said MQWSs designed to attenuate at a different wavelength;
    separating a beam of light into a plurality of subbeams, each subbeam having a different wavelength;
    directing each of said subbeams onto the one at said MQWSs designed to attenuate the corresponding wavelength;
    attenuating said light beams in said MQWSs;
    exiting said light beams from said MQWSs;
    directing a portion of said exit light beams onto a photodetector to provide feedback signals and
    utilizing said feedback signals to regulate the current in, and thus the attenuation of, said MQWSs.

16. A method as in claim 15 wherein said step of providing comprises providing a photo intrinsic diode (PIN) structure including one of said MQWSs.

17. A method as in claim 15 wherein said step of providing comprises providing a self-electro-optic effect device (SEED) including one of said MQWSs.

18. A method as in claim 15 wherein said step of utilizing comprises providing a reference signal and comparing said reference signal to one of said feedback signals to regulate said current.

* * * * *